United States Patent
Bouchain et al.

(10) Patent No.: US 9,173,411 B2
(45) Date of Patent: Nov. 3, 2015

(54) PRODUCT CONTAINING MAGNESIUM PYROPHOSPHATE AND USE THEREOF AS A RAISING ACID FOR THE PRODUCTION OF BAKERY PRODUCTS

(75) Inventors: Wolfgang Bouchain, Wiesbaden (DE); Joachim Markmann, Dorsheim (DE); Rainer Schnee, Mainz (DE); Ruediger Wissemborski, Gau-Algesheim (DE)

(73) Assignee: Chemische Fabrik Budenheim KG, Budenheim (DE)

( * ) Notice: Subject to any disclaimer, the term of this patent is extended or adjusted under 35 U.S.C. 154(b) by 809 days.

(21) Appl. No.: 12/658,424

(22) Filed: Feb. 11, 2010

(65) Prior Publication Data

US 2011/0111110 A1 May 12, 2011

(30) Foreign Application Priority Data

Nov. 11, 2009 (EP) .................... 09175720

(51) Int. Cl.
| | |
|---|---|
| A23P 1/00 | (2006.01) |
| A21D 2/02 | (2006.01) |
| A21D 2/30 | (2006.01) |
| A23L 1/30 | (2006.01) |
| A23L 1/304 | (2006.01) |
| C01B 25/42 | (2006.01) |

(52) U.S. Cl.
CPC .. *A21D 2/02* (2013.01); *A21D 2/30* (2013.01); *A23L 1/3002* (2013.01); *A23L 1/304* (2013.01); *C01B 25/42* (2013.01); *A23V 2002/00* (2013.01)

(58) Field of Classification Search
CPC ............ A21D 2/02; A21D 2/30; A23L 1/304; A23V 2002/00; C01B 25/42
USPC ....................................................... 426/563
See application file for complete search history.

(56) References Cited

U.S. PATENT DOCUMENTS

| | | | |
|---|---|---|---|
| 3,852,497 A | | 12/1974 | Skelcey et al. |
| 5,225,226 A | * | 7/1993 | Thomas et al. ............... 426/561 |
| 5,405,636 A | | 4/1995 | Gard et al. |
| 5,409,724 A | | 4/1995 | Heidolph et al. |
| 6,080,441 A | * | 6/2000 | Chung et al. .................. 426/563 |

FOREIGN PATENT DOCUMENTS

EP  0648421 A2  4/1995

OTHER PUBLICATIONS

Kirk-Othmer Food and Feed Technology, Dec. 2007, pp. 84 and 89.*
"Magnesium Phosphate" In: George A. Burdock; "Food and Color Additives"; Jan. 1, 1996; CRC Press, Boca Raton, vol. 2, pp. 1629-1630.
M. Rao: "Monomagnesium Phosphage, Trisodium Diphosphate"; Jan. 1, 2004; pp. 1-5, retrieved from the Internet: URL: ftp://ftp.fao.org/es/esn/jecfa/cta/CTA_61_Phosphates.pdf [retrieved on Feb. 15, 2010].
'Richtlinie fur Backtriebmittel, Backpulver, Hirschhornsalz und Pottaschei [Guidelines for Bakery Raising Agents, Baking Powder, Baker's Salt and Potash] (BLL 1962). (English Translation Only).
Brose et al. 'Chemische Backtriebmittel'; 2nd edition, 2007.
Council Directive 90/4964/EEC of Nov. 21, 2008 on nutrition labeling for foodstuffs.

* cited by examiner

*Primary Examiner* — Rena L Dye
*Assistant Examiner* — Lela S Williams
(74) *Attorney, Agent, or Firm* — Michael L. Dunn

(57) ABSTRACT

A product which contains acid magnesium pyrophosphate (magnesium dihydrogen diphosphate) and at least magnesium orthophosphate, producible by removal of water from an aqueous solution or suspension of a magnesium phosphate compound which has a molar ratio of Mg:P of 0.4-0.6:1, wherein the product has a loss on ignition of 7.5 to 13.5% and its method of preparation and its use in a leavening agent for bakery products.

10 Claims, No Drawings

PRODUCT CONTAINING MAGNESIUM PYROPHOSPHATE AND USE THEREOF AS A RAISING ACID FOR THE PRODUCTION OF BAKERY PRODUCTS

CROSS REFERENCE TO RELATED APPLICATIONS

This application claims priority from European Patent Application EP09175720.3 filed Nov. 11, 2009.

BACKGROUND OF THE INVENTION

The invention concerns a product which contains acid magnesium pyrophosphate (magnesium dihydrogen diphosphate) and at least magnesium orthophosphate, as well as the production thereof and the use thereof as a raising acid in a leavening agent for the production of bakery products.

In the production of bakery products, added to the mass or dough are leavening agents which during production of the bakery products liberate gas, generally carbon dioxide gas, which causes the mass or dough to rise and thus loosens it. Thermally induced gas carriers or chemical leavening (raising) systems can be used for that purpose. In the case of the chemical bakery leavening systems a carbon dioxide carrier reacts with an acid carrier (raising acid), with liberation of carbon dioxide $CO_2$.

Sodium hydrogen carbonate ($NaHCO_3$; sodium bicarbonate) is very frequently used as the carbon dioxide carrier, but other carbon dioxide carriers are also employed such as potassium hydrogen carbonate, potassium carbonate (potash), ammonium hydrogen carbonate (ABC raising agent) and baker's salt, a mixture of ammonium compounds of carbonic and carbamic acid, sodium carbonate, magnesium carbonate, magnesium hydrogen carbonate, calcium carbonate, calcium hydrogen carbonate, aluminum carbonate, aluminum hydrogen carbonate, iron carbonate, iron hydrogen carbonate, ammonium carbonate or ammonium carbamate.

Various acids and acid salts are known as acid carriers (raising acids). A list of the most important raising acids is to be found for example in the 'Richtlinie fur Backtriebmittel, Backpulver, Hirschhornsalz and Pottasche' [Guidelines for Bakery Raising Agents, Baking Powder, Baker's Salt and Potash] (BLL 1962) and in the literature at Brose et al. 'Chemische Backtriebmittel'; 2nd edition, 2007.

Some raising acids suffer from the disadvantage that they already react very quickly with the carbon dioxide carrier in the preparation of mass or dough, when water is added, and then there is no longer any carbon dioxide available for the leavening action during the standing time or during baking That is a problem in particular for bakery products involving a prolonged baking time. For that purpose acid sodium pyrophosphate (SAPP) is frequently used as a raising acid in bakery leavening systems as it reacts with a delay. That however can adversely affect the baking result by virtue of a typical, frequently undesired particular taste (pyrophosphate taste) which occurs in particular when a large amount is involved.

Further examples of phosphate-bearing and phosphate-free raising acids are monocalcium phosphate monohydrate (MCPM), anhydrous monocalcium phosphate (AMCP), dicalcium phosphate dihydrate (DCPD), acid calcium pyrophosphate (CAPP), acid sodium aluminum phosphate (SALP), sodium aluminum sulphate (SAS), tartar (acid potassium tartrate), gluconic acid delta lactone (GDL), citric acid, tartaric acid, and fumaric acid.

EP-A-O 648 421 describes a bakery leavening system which as the raising acid contains dimagnesium phosphates, namely a mixture of dimagnesium phosphate trihydrate, amorphous dimagnesium phosphate and optionally a small amount of dimagnesium pyrophosphate. In the baking test the mixture of dimagnesium phosphate trihydrate and amorphous dimagnesium phosphate did not exhibit sufficiently good baking products. The bakery products obtained were scarcely loosened, they had an excessively dense pore configuration, sticky chewing properties and an unpleasant strange taste. The strange taste was caused by an excessively slight neutralization reaction with the carbon dioxide carrier, which was confirmed by measurement of the pH-value of the bakery product which was excessively alkaline with a value of 8.4.

Two particularly important factors for characterizing raising acids are the neutralization value (NV) and the rate of reaction (ROR).

The neutralization value (NV) specifies how much acid carrier is required to neutralize a given carbon dioxide carrier. It is obtained by dividing the amount of carbon dioxide carrier by the amount of acid carrier which is used for neutralization of the carbon dioxide carrier, and multiplying the resulting quotient by 100. Where neutralization values are specified, they always relate to sodium hydrogen carbonate as the carbon dioxide carrier unless something different is expressly specified.

The rate of reaction is the percentage of the amount of carbon dioxide gas which actually occurs, in comparison with the amount of carbon dioxide gas that can be theoretically obtained upon complete reaction, in the reaction of carbon dioxide carrier and acid carrier at a temperature of 27° C. for a period of 8 minutes. If this patent application specifies values for the rate of reaction, they always relate to sodium hydrogen carbonate as the carbon dioxide carrier unless something different is expressly specified.

Leavening systems for the production of bakery products are frequently of such a composition that upon storage prior to use at ambient temperature, as far as possible, they do not undergo reaction, with the formation of carbon dioxide gas. The liberation of carbon dioxide gas should preferably only occur at elevated temperature, generally at baking temperature. In addition to the choice of carbon dioxide carrier or carriers and acid carrier or carriers, the properties and the reactivity of the leavening system can be influenced by additives such as, for example, separating agent for preventing or delaying premature reaction between the carbon dioxide carrier and the acid carrier. Suitable substances for that purposes are, for example, grain starch such as maize starch, rice starch or wheat starch, modified meal flour, silicon dioxide, tricalcium phosphates, calcium carbonate, calcium sulphate, fats and mixtures of the aforementioned substances.

The raising acids are frequently used individually in the leavening systems; however, they can also be used as mixtures, so-called 'double acting baking powder', in which case the selection of raising acids with different rates of reaction makes it possible to influence the foaming properties in order to achieve particularly homogeneous pore formation. It is assumed that the combination of a slow reacting and a fast-reacting acid carrier initially provides for the formation of a multiplicity of small foam bubbles by virtue of the acid carrier which reacts more quickly, at a relatively high speed, the foam bubbles then being filled up in the reaction with the more slowly reacting acid carrier at relatively low speed. In that case highly uniform foaming and pore formation are observed.

A problem of the invention was that of providing a product which is also suitable as a raising acid for the production of bakery products, with which disadvantages of the known raising acids are overcome and which achieves a good loosening and pore formation effect in respect of the bakery products at advantageous rates of reaction.

BRIEF SUMMARY OF THE INVENTION

The above problems are solved by an acid product which contains acid magnesium pyrophosphate (magnesium dihydrogen diphosphate) and at least magnesium orthophosphate, wherein the product is producible by removal of water from an aqueous solution or suspension of a magnesium phosphate compound which has a molar ratio of Mg:P of 0.4-0.6:1, wherein the product has a loss on ignition of 7.5 to 13.5%. Preferably the water removal operation is effected thermally by heating to elevated temperatures.

The product desirably contains 30 to 99% by weight of pyrophosphate-$P_2O_5$ and 1 to 70% by weight of orthophosphate-$P_2O_5$, wherein the percentages by weight relate to the total $P_2O_5$ content in the product.

The magnesium phosphate compound is desirably an orthophosphate compound.

The invention also includes methods of making a bakery product using the product as an acid system in a leavening agent and a method of making the acid product.

DETAILED DESCRIPTION OF THE INVENTION

The product according to the invention is suitable as a raising acid in a leavening system for the production of bakery products. It has the advantage that, in comparison with many other raising acids, it has a low content of sodium and aluminum ions, the amounts of which are sought to be progressively more greatly reduced in foodstuffs by virtue of health considerations. Surprisingly better baking results are achieved with the product according to the invention as a raising acid, in comparison with known calcium pyrophosphate-containing raising acids.

Magnesium belongs to the essential substances and must therefore be supplied to the body in an adequate amount on a daily basis. The recommended daily allowance (RDA) of magnesium is 375 mg for an adult, but it can be higher for example for sports persons, in the case of illnesses or when taking certain drugs (source: Council Directive 90/496*IEEC* of 21st November 2008 on nutrition labeling for foodstuffs). A further advantage of the product according to the invention is that magnesium is introduced into the bakery products in the production of bakery products and is thus supplied to the body when the bakery products are consumed. The bakery products produced with the product according to the invention can therefore represent a nutritional supplement which is advantageous in terms of magnesium requirement.

The product according to the invention is not a pure substance but a mixture of substances which governed by its manner of manufacture contains at least acid magnesium pyrophosphate and magnesium orthophosphate. When reference is made herein to proportions or percent by weight (% wt) of pyrophosphate-$P_2O_5$ or orthophosphate-$P_2O_5$, that refers in each case to the $P_2O_5$ proportion present as pyrophosphate or orthophosphate respectively, relative to the total $P_2O_5$ content in the product, in which respect it is clear to the man skilled in the art that here the detail $P_2O_5$ is the calculated reference value usual in the field for specifying the phosphate content.

In an embodiment of the invention the product according to the invention contains 30 to 99% by weight of pyrophosphate-$P_2O_5$ and 1 to 70% by weight of orthophosphate-$P_2O_5$, wherein 90 to 99% by weight of pyrophosphate-$P_2O_5$ and 1 to 10% by weight of orthophosphate-$P_2O_5$ are particularly suitable.

An excessively low proportion of pyrophosphate suffers from the disadvantage of an excessively fast reaction with the carbon dioxide carrier during use as a raising acid.

In a further embodiment of the invention the magnesium phosphate compound, from the aqueous solution or suspension of which the product according to the invention can be obtained by thermal removal of water, is an orthophosphate compound, preferably mono-magnesium orthophosphate. It has a theoretical molar ratio of Mg:P of 0.5:1.0.

Aqueous solution or suspension of the magnesium phosphate compound from which the product according to the invention can be obtained by removal of water does not however have to be produced by dissolving or suspending a magnesium orthophosphate. It can also be produced by stirring a magnesium compound into phosphoric acid. Examples in that respect are to be found herein in the examples hereinafter.

The loss on ignition of the product according to the invention is in the range of 7.5 to 13.5%. In a further embodiment of the invention the product according to the invention has a loss on ignition of 9 to 11.5%. An excessively low loss on ignition suffers from the disadvantage that a proportion of long-chain magnesium phosphates occurs, which reduce the neutralization value. An excessively high loss on ignition has the disadvantage that the product tends to lump formation upon storage.

The loss on ignition is determined by strongly heating about 2 g of sample at 800° C. for 30 minutes and determining the loss of mass in the heating operation.

In a further embodiment of the invention the product according to the invention can be produced by the removal of water at 140 to 300° C., preferably 180 to 250° C. An excessively low water removal temperature has the disadvantage of incomplete or excessively low phosphate formation. An excessively high water removal temperature has the disadvantage that unwanted long-chain magnesium phosphates are formed.

The product according to the invention can advantageously be produced by the removal of water in a rotary tube or in a spray tower.

In rotary tube production it is possible to use both the co-flow method and also the counter-flow method. In the co-flow method the phosphate solution is sprayed through a flame which reaches into the rotary tube on to a hot bed of product from which water has already been removed. The material then passes with the hot air flow to the discharge end and water is removed.

In the spray tower production the phosphate solution is sprayed into the spray tower head by way of multi-substance nozzles. A flame zone is produced by burners in the spray tower head. The phosphate solution which is sprayed in moves in co-flow relationship with the burner gases downwardly and water is thus removed.

In a further embodiment the product according to the invention has a neutralization value (NV) of 30 to 100, preferably 50 to 90, particularly preferably 60 to 80. Keeping the neutralization value of the product in that range has the advantage that small batch amounts are required in relation to the carbon dioxide carrier.

In a further embodiment the product according to the invention has a rate of reaction (ROR) of 5 to 60, preferably 7 to 35, particularly preferably 10 to 25. Keeping the ROR of the product in that range has the advantage of a low level of advance (carbon dioxide loss) and thus good loosening of the bakery products.

An excessively low ROR has the disadvantage that excessively late carbon dioxide development occurs in the oven and as a result the bakery product is not sufficiently loosened up. An excessively high ROR has the disadvantage of an excessively fast preliminary reaction and a small bakery volume.

In a further embodiment the product according to the invention has a grain size of less than 500 µm, preferably less than 300 µm, particularly preferably less than 200 µm.

The grain size of the product is determined in the sieve method. Keeping it in the aforementioned range has the advantage that the product is uniformly distributed in the mixing operation and at the same time can still be well handled. An excessively low grain size suffers from the disadvantage that the product powders and dusts very greatly and easily forms lumps. In addition very small grain sizes are complicated and thus costly to produce. An excessively great grain size suffers from the disadvantage that the product has worse solubility and cannot completely react during the baking procedure.

The present invention further includes a leavening system for the production of bakery products with a carbon dioxide carrier and a raising acid system, wherein the raising acid system contains acid magnesium pyrophosphate and/or the above described product according to the invention.

In a further embodiment of the invention the raising acid contains at least one further raising acid different from acid magnesium pyrophosphate or the product according to the invention. Advantageously, that at least one further raising acid includes acid sodium pyrophosphate (SAPP), acid sodium aluminum phosphate (SALP), sodium aluminum sulphate (SAS), monocalcium phosphate monohydrate (MCPM), anhydrous monocalcium phosphate (AMCP), dicalcium phosphate dihydrate (DCPD), acid calcium pyrophosphate (CAPP), citric acid, tartaric acid, tartar (potassium hydrogen tartrate), glucono-delta lactone, sodium hydrogen citrate, fumaric acid or mixtures or combinations of the aforementioned substances.

Particularly preferably the leavening system according to the invention contains as the carbon dioxide carrier sodium hydrogen carbonate which reacts with the raising acid system, with the liberation of carbon dioxide. Other carbon dioxide carriers as are known in the art can however also be used.

The invention further concerns the use of acid magnesium pyrophosphate or the above-described product according to the invention as a raising acid system in the production of bakery products.

The invention further concerns the production of a product which contains acid magnesium pyrophosphate (magnesium dihydrogen diphosphate) and at least magnesium orthophosphate by removal of water from an aqueous solution or suspension of a magnesium phosphate compound which has a molar ratio of Mg:P of 0.4-0.6:1, wherein the water removal operation is carried out to a loss on ignition of 7.5 to 13.5%.

The use of acid magnesium pyrophosphate or a product which in the manner according to the invention contains acid magnesium pyrophosphate in combination with further magnesium phosphate compounds as a raising acid for the production of bakery products has hitherto not been known to the inventors. It was therefore surprising that good baking results are achieved with such a raising acid system and it was possible to overcome the disadvantages of the state of the art.

Besides the use as a raising acid for the production of bakery products, for example, the product according to the invention can also be used for foaming plastic materials and paints and dyes.

The invention is further described by the examples hereinafter without being limited thereto.

Example 1

Raising Acid Production

For the production of product according to the invention which contains acid magnesium pyrophosphate it is possible to produce a magnesium phosphate solution by stirring, for example, commercially available magnesium sources such as Mg(OH)2, MgO or MgCO3 into phosphoric acid. The magnesium phosphate solution is then converted into an acid magnesium pyrophosphate with a drying assembly at a temperature of 140° C. to 300° C. Any assembly which can achieve the required temperatures can be considered as a suitable drying assembly. Kneading, mixing and rotary tube dryers have proven to be particularly suitable. Drying and condensation of the magnesium phosphate solution to give the acid magnesium pyrophosphate can be effected continuously and discontinuously.

Approach (a)

600 g of phosphoric acid (85%) is dissolved in 742 g of desalinated water, and 209 g of magnesium oxide is added thereto. The mixture is dried for 18 hours in a vacuum at 145° C. until a loss on ignition of the end product of 13.2% is reached.

Approach (b)

58.3 g of magnesium hydroxide which is mixed into 80 ml of desalinated water is added to 267 g of phosphoric acid (75%). The mixture is dried in a porcelain dish at 250° C. until a loss on ignition of the end product of 9.0% is reached.

Approach (c)

116.6 g of magnesium hydroxide which is mixed into 160 ml of desalinated water is added to 533.6 g of phosphoric acid (75%). The mixture is dried in an oil-heated kneading assembly at a temperature of 280° C. until a loss on ignition of the end product of 11.5% is reached.

Approach (d)

167.6 g of magnesium carbonate which is mixed into 160 ml of desalinated water is added to 533.6 g of phosphoric acid (75%). The mixture is dried in an oilheated kneading assembly at a temperature of 280° C. until a loss on ignition of the end product of 9.2% is reached.

Approach (e)

270 kg of mashed magnesium hydroxide is added to 1216 kg of phosphoric acid (75%). The resulting magnesium phosphate solution is sprayed in an open rotary tube on to a residue material bed and converted at a product temperature of 180-250° C. into a magnesium pyrophosphate-containing product until a loss on ignition of 9.0-11.5% is reached.

Analysis results for approaches (a) to (e) are set out in Table 1 hereinafter.

TABLE 1

Analysis results for approaches (a) to (e)

| Approach | Total P2O5 [%] | MgO [%] | LOI (800° C.) [%] | Pyro P$_2$O$_5$/Ortho-P$_2$O$_5$ [%/%] | NV | ROR [% CO2) |
|---|---|---|---|---|---|---|
| (a) | 68.2 | 19.1 | 13.2 | 93/7 | 75 | 22 |
| (b) | 71.4 | 19.6 | 9.0 | 96/4 | 65 | 19 |
| (c) | 69.5 | 19.1 | 11.5 | 95/5 | 67 | 14 |
| (d) | 70.6 | 19.8 | 9.2 | 96/4 | 68 | 17 |
| (e) | 69.6 | 19.4 | 11.0 | 95/5 | 70 | 12 |

Pyro-P$_2$O$_5$ (pyrophosphate-P$_2$O$_5$) ortho-P$_2$O$_5$ (orthophosphate-P$_2$O$_5$ are relative percentages which relate to the total P$_2$O$_5$ content in the product.

Example 2

Mass Production

The masses were produced in accordance with the following composition for carrying out comparative tests in accordance with the examples hereinafter.

TABLE 2

Dough composition

| Constituents | [g] |
|---|---|
| Sugar, fine | 270 |
| Wheat flour type 550 | 200 |
| Whole egg | 150 |
| Baking margarine | 120 |
| Wheat starch | 100 |
| Water | 100 |
| Beating-up emulsifier | 15 |
| NaHC03 | 2.5 |
| NaCl | 2 |
| Raising acid or raising acid combination | (*) |

(*) The raising acid or raising acid combination, unless otherwise stated, was used in an amount which in accordance with its neutralization value (theoretical) leads to complete neutralization of the carbon dioxide carrier used, sodium hydrogen carbonate.

The following applies for pure raising acids:

$$\text{gram of acid carrier} = \frac{\text{gram carbon dioxide carrier} \times 100}{NV}$$

The following applies for raising acid combinations:

$$\text{gram of acid carrier in total} = \frac{\text{gram carbon dioxide carrier} \times 100}{\%1 \times NV1 + \%2 \times NV2 + \%3 \times NV3}$$

%1, %2, %3 . . . =percent by weight of acid carrier 1, 2, 3 . . . in the raising acid combination. NV1, NV2, NV3 . . . =neutralization value of acid carrier 1, 2, 3 . . . in the 5 raising acid combination.

Mass Production in the all-in Method

The whole egg used was homogenised prior to use in an Ultra-Turrax (Janke & Kunkel) and just like the water set to ambient temperature. The dry ingredients were weighed out together into a pan and well stirred with an eggbeater. The margarine was weighed in separately, added to the mixed dry ingredients and roughly broken up with a flat stirrer. The ingredients were then transferred into the stirring pan of a stirring machine (Hobart) and initially stirred to lowest stage 1. After 15 seconds the weighed out homogenised whole egg and the measured amount of water were added. After a further 20 seconds stirring was then effected to the next higher stage 2 for 1 minute and thereafter to the next higher stage 3 for a further 3 minutes. The stirring machine was then switched off.

Portions of the mass, each weighing 400 g, were weighed out into moulds and baked for 45 minutes in an oven at 200° C. lower heating and 220° C. upper heating. The 20 baking results are set out in Table 3 hereinafter.

TABLE 3

Baking results

| Raising system | NV | ROR [% CO$_2$] | specific bakery vol [ml/g] | pH-value variation after 5 min/40 min/in the finished bakery | Taste/chewing properties |
|---|---|---|---|---|---|
| 3.8 g product (b) 2.5 gNaHC03 | 65 | 19 | 2.62 | 7.8/7.6/7.5 | typical bakery |
| 3.7 product (d) 2.5 gNaHC03 | 68 | 17 | 2.60 | 7.8/7.8/7.4 | typical bakery |
| 3.6 g product (e) 2.5 gNaHC03 | 70 | 12 | 2.64 | 7.8/7.7/7.3 | typical bakery |
| 3.5 g SAPP 2.5 gNaHC03 | 73 | 26 | 2.51 | 7.5/7.4/7.5 | slight strange taste/typical bakery |
| 3.2 g MCPM 2.5 gNaHC03 | 80 | 60 | 2.24 | 6.9/6.9/7.3 | typical bakery/very sticky |

TABLE 3-continued

Baking results

| Raising system | NV | ROR [% $CO_2$] | specific bakery vol [ml/g] | pH-value variation after 5 min/ 40 min/in the finished bakery | Taste/chewing properties |
|---|---|---|---|---|---|
| 7.6 g DCPD 2.5 gNaHC03 | 33 | 11 | 2.49 | 8.0/8.0/7.6 | typical bakery |
| 4.8 g CAPP 2.5 gNaHC03 | 52 | 22 | 2.55 | 7.5/7.4/7.3 | typical bakery |

The baking results show the advantages of the products according to the invention used, in relation to comparative examples. The products according to the invention used as raising acids all gave higher bakery volumes which involved improved loosening of the bakery crumb. A strange taste was not found.

The use of SAPP gave a lower specific bakery volume and a slight foreign taste was found. The use of MCPM in the raising system gave a very small specific bakery volume and severely sticky chewing properties. DCPD in the raising system also resulted in a relatively small specific bakery volume and, by virtue of the low NV, required the addition of a large amount of that raising acid. CAPP as the raising acid gave no advantages over raising systems according to the invention.

What is claimed is:

1. A product which contains acid magnesium pyrophosphate and at least magnesium orthophosphate, the product being producible by removal of water from an aqueous solution or suspension of a magnesium phosphate compound, the aqueous solution or suspension having a molar ratio of Mg:P of 0.4-0.6:1, wherein the product has a loss on ignition of 7.5-13.5%, and wherein the product contains 30-99% by weight of pyrophosphate-$P_2O_5$ and 1-70% by weight of orthophosphate-$P_2O_5$, wherein the percentages by weight relate to the total $P_2O_5$-content in the product.

2. A product according to claim 1 wherein the magnesium phosphate compound is an orthophosphate compound.

3. A product according to claim 1 wherein the product has a loss on ignition of 9 to 11.5%.

4. A product according to claim 1 wherein the product can be produced by the removal of water at 140 to 300° C.

5. A product according to claim 1 wherein the product can be produced by the removal of water in a rotary tube or a spray tower.

6. A product according to claim 1 wherein the product has a neutralization value (NV) of 30 to 100.

7. A product according to claim 1 wherein the product has a neutralization value (NV) of 60 to 80.

8. A product according to claim 1 wherein the product has a rate of reaction (ROR) of 7 to 35 percent carbon dioxide.

9. A product according to claim 1 wherein the product has a grain size of less than 500 μm.

10. A product according to claim 1 wherein the product has a grain size of less than 200 μm.

* * * * *